United States Patent
Li

(10) Patent No.: US 10,877,207 B1
(45) Date of Patent: Dec. 29, 2020

(54) BACKLIGHT MODULE AND DISPLAY DEVICE

(71) Applicant: WUHAN CHINA STAR OPTOELECTRONICS TECHNOLOGY CO., LTD., Wuhan (CN)

(72) Inventor: Shengming Li, Wuhan (CN)

(73) Assignee: WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 16/753,781

(22) PCT Filed: Nov. 11, 2019

(86) PCT No.: PCT/CN2019/117000
§ 371 (c)(1),
(2) Date: Apr. 5, 2020

(51) Int. Cl.
*F21V 8/00* (2006.01)
*G02F 1/13357* (2006.01)
(Continued)

(52) U.S. Cl.
CPC ......... *G02B 6/0088* (2013.01); *G02B 6/0031* (2013.01); *G02B 6/0093* (2013.01);
(Continued)

(58) Field of Classification Search
CPC .. G02B 6/0088; G02B 6/0031; G02B 6/0045; G02B 6/0053; G02B 6/0093;
(Continued)

(56) References Cited

U.S. PATENT DOCUMENTS

2017/0123140 A1* 5/2017 Han ............... G02B 6/0045
2017/0153486 A1* 6/2017 Ahn ............... G02B 6/005
(Continued)

FOREIGN PATENT DOCUMENTS

CN 108227304 A 6/2018
CN 109637373 A 4/2019
(Continued)

OTHER PUBLICATIONS

Zhang et al. "Display Device", Aug. 16, 2019, Machine Translation of CN209267639U, pp. 1-12.*
(Continued)

*Primary Examiner* — Alan B Cariaso
(74) *Attorney, Agent, or Firm* — JMB Davis Ben-David

(57) ABSTRACT

A backlight module and a display device are provided. The backlight module includes a frame body having a frame surface and a connecting part connected to the frame surface; a reflection sheet disposed on the frame surface; a light guide plate disposed on the reflection sheet; an optical film group disposed on the light guide plate, the optical film group includes a light enhancement sheet, and a top of the connecting part is connected to the light enhancement sheet through a plastic frame; a light-shielding sheet disposed on the optical film group; a blind hole, the blind hole penetrates from the frame surface to the light-shielding sheet, and the connecting part is disposed at a periphery of the blind hole; and an opaque glue layer disposed between the plastic frame and the light enhancement sheet.

10 Claims, 2 Drawing Sheets

(51) Int. Cl.
*H04M 1/02* (2006.01)
*G09F 9/35* (2006.01)

(52) U.S. Cl.
CPC .. *G02F 1/133606* (2013.01); *G02F 1/133608*
(2013.01); *G09F 9/35* (2013.01); *H04M*
*1/0264* (2013.01)

(58) Field of Classification Search
CPC ......... G02F 1/133606; G02F 1/133608; G02F
2001/133314; G09F 9/35; H04M 1/0264;
H04N 5/225
See application file for complete search history.

(56) References Cited

U.S. PATENT DOCUMENTS

2017/0336549 A1   11/2017   Lo et al.

| | | | |
|---|---|---|---|
| 2020/0174319 A1* | 6/2020 | Chang | G02F 1/133605 |
| 2020/0186688 A1* | 6/2020 | Chen | G02F 1/133512 |
| 2020/0192148 A1* | 6/2020 | Kim | G02F 1/133602 |

FOREIGN PATENT DOCUMENTS

| CN | 110138935 A | 8/2019 |
|---|---|---|
| CN | 209233928 U | 8/2019 |
| CN | 209267639 U | 8/2019 |

OTHER PUBLICATIONS

Jia Yuhu, "Electronic Device", Aug. 9, 2019, Machine Translation of CN209233928U, EPO, pp. 1-13.*
Liu Min, "Display Assembly and Terminal Device", Aug. 16, 2019, Machine Translation of CN110138935A, EPO, pp. 1-13.*
Hong Jinlong, "Display Module and Display Device", Apr. 16, 2019, Machine Translation of CN109637373A, pp. 1-23.*

* cited by examiner

BACKLIGHT MODULE AND DISPLAY DEVICE

CROSS-REFERENCE TO RELATED APPLICATIONS

This is the U.S. National Stage of International Patent Application No. PCT/CN2019/117000 filed Nov. 11, 2019, which in turn claims the benefit of Chinese Patent Application No. 201910780300.9 filed Aug. 22, 2019.

BACKGROUND OF INVENTION

Field of Invention

The present invention relates to the field of display technology, and more particularly, to a backlight module and a display device.

Description of Prior Art

With development of display technology, display devices, such as mobile phones, are increasingly demanding higher aspect ratio for viewing area; that is, an area ratio of a display area of a display device to a non-display area is increasingly greater. Thus, it is inevitable to adopt irregular display, and some irregular structures are designed as closed shapes (such as circular, rectangular, and other regular or irregular shapes) or open shapes (such as semicircular, rectangular, and other regular or irregular shapes).

Due to limitation of display size, effective adhesion area of a light-shielding tape at an irregular structure of a backlight, which is a blind hole, is small. During reliability test, the light-shielding tape easily separates and falls off, resulting in problems such as light leakage and entry of foreign objects.

In order to shield light and prevent dust, a blind hole light-shielding tape (double-sided tape) is attached around the blind hole. Due to a limitation of a display frame size at the blind hole, a width of a plastic frame attached with the blind hole light-shielding tape is usually only 0.2 mm to 0.35 mm, and sometimes there is no plastic frame.

A width attached with the blind hole light-shielding tape is only 0.1 mm of an iron frame, and the effective adhesion area between the light-shielding tape and the plastic or iron frame is small. During reliability test, the light-shielding tape easily separates and falls off, resulting in problems such as light leakage and entry of foreign objects.

SUMMARY OF INVENTION

In order to solve the above technical problem, a backlight module and a display device are provided. By redesigning the light-shielding structure, liquid glue is used to connect the iron frame or plastic frame to the light enhancement sheet. It is not necessary to consider a width of connection between the plastic frame and the light enhancement sheet, so it can effectively prevent the light-shielding glue from dropping off.

A backlight module comprises a frame body comprising a frame surface and a connecting part connected to the frame surface; a reflection sheet disposed on the frame surface; a light guide plate disposed on the reflection sheet; an optical film group disposed on the light guide plate, and the optical film group comprises a light enhancement sheet, and a top of the connecting part is connected to the light enhancement sheet through a plastic frame; a light-shielding sheet disposed on the optical film group; a blind hole, and the blind hole penetrates from the frame surface to the light-shielding sheet, and the connecting part is disposed at a periphery of the blind hole; and an opaque glue layer disposed between the plastic frame and the light enhancement sheet.

In one embodiment, the optical film group further comprises a diffusion sheet, and the diffusion sheet is disposed on the light guide plate, and the light enhancement sheet is disposed on the diffusion sheet.

In one embodiment, the opaque glue layer is made of liquid glue.

In one embodiment, a color of the opaque glue layer comprises black color or gray.

In one embodiment, a thickness of the opaque glue layer is 0.03 mm to 0.1 mm.

In one embodiment, the backlight module further comprises a light-shielding enhancement layer, and the light-shielding enhancement layer is disposed on an upper surface or a lower surface of the light enhancement sheet, and the light-shielding enhancement layer is correspondingly disposed at a connection between the frame body and the light enhancement sheet.

In one embodiment, material of the light-shielding enhancement layer comprises black ink or light-shielding black stripes.

In one embodiment, a thickness of the light-shielding enhancement layer is 0.02 mm to 0.05 mm.

A display device is further provided to comprise the backlight module.

In one embodiment, the display device further comprises a display screen, and the light-shielding sheet of the backlight module is disposed on a side of the display screen; and a cover plate disposed on a side of the display screen away from the backlight module. The blind hole penetrates from the backlight module to a surface of the cover plate.

The present invention has the following beneficial effects. A backlight module and a display device are provided. By redesigning a light-shielding structure, liquid glue is used to connect an iron frame or plastic frame to a light enhancement sheet. It is not necessary to consider a width of connection between the plastic frame and the light enhancement sheet, and a light-shielding glue is effectively prevented from separating and falling off, thereby further preventing foreign objects such as dust from entering the backlight module and causing product failure. At a same time, black ink or light-shielding black strips are added at a connection between the plastic frame and the light enhancement sheet to further increase a light-shielding effect.

BRIEF DESCRIPTION OF DRAWINGS

In order to more clearly illustrate the technical solutions in the embodiments, the drawings described in the description of the embodiments are briefly described below. It is obvious that the drawings in the following description are only some embodiments of the present invention. Other drawings can also be obtained from those skilled persons in the art based on drawings without any creative effort.

The present invention is further explained below with reference to the drawings and embodiments.

Figure 1:
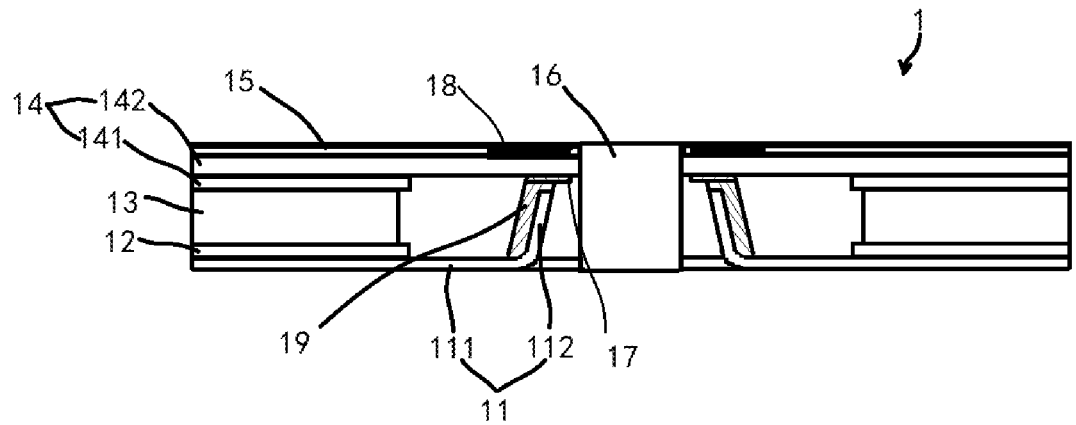
FIG. 1 is a structural view of a backlight module according to a first embodiment of the present invention.

REFERENCE NUMERALS display device 100; backlight module 1; display screen 2; cover plate 3; camera 4; frame body 11; frame surface 111; connecting part 112; reflection sheet 12; light guide plate 13; optical film group 14; diffusion sheet 141; light enhancement sheet 142; light-shielding sheet 15; blind hole 16; opaque glue layer 17; light-shielding enhancement layer 18; and plastic frame 19.

DETAILED DESCRIPTION OF PREFERRED EMBODIMENTS

Directional terms mentioned in this application, such as "up", "down", "forward", "backward", "left", "right", "top", "bottom", etc., merely indicate the direction of the drawings. Therefore, the directional terms are used for illustrating and understanding of the application rather than limiting thereof.

In a first embodiment, referring to FIG. 1, a backlight module includes a frame body 11, a reflection sheet 12, a light guide plate 13, an optical film group 14, a light-shielding sheet 15, a blind hole 16, and an opaque glue layer 17.

The frame body 11 includes a frame surface 111 and a connecting part 112 connected to the frame surface 111. In this embodiment, the frame body 11 is an iron frame.

The reflection sheet 12 is disposed on the frame surface 111. The light guide plate 13 is disposed on the reflection sheet 12.

The optical film group 14 is disposed on the light guide plate 13. In this embodiment, the optical film group 14 has a light enhancement sheet 142 and a diffusion sheet 141.

The diffusion sheet 141 is disposed on the light guide plate 13, and the light enhancement sheet 142 is disposed on the diffusion sheet 141. The connecting part 112 is bent from the frame surface 111 to the light enhancement sheet 142, and a top of the connecting part 112 is connected to the light enhancement sheet 142 through a plastic frame 19. In order to enhance light-shielding effect, the plastic frame 19 extends from the top of the connecting part 112 along the connecting part 112 toward the frame surface 111.

In the embodiment, an opaque glue layer 17 is disposed between the plastic frame 19 and the light enhancement sheet 142. In order to improve a narrow width of a conventional plastic frame 19 and overcome a difficulty of cutting ordinary double-sided tape to have a suitable width so that the ordinary double-sided tape having a suitable width may be easily and firmly attached to the plastic frame 19, the opaque glue layer 17 of the present application adopts liquid glue. A color of the opaque glue layer 17 can be black or gray. Of course, the opaque glue layer 17 may also adopt other colors.

The light-shielding sheet 15 is disposed on the optical film group 14. The blind hole 16 penetrates from the frame surface 111 to the light-shielding sheet 15, and the connecting part 112 is disposed at a periphery of the blind hole 16. In order to make the opaque glue layer 17 at the blind hole 16 be effectively attached between the plastic frame 19 and the light enhancement sheet 142, a thickness of the opaque glue layer 17 is 0.03 mm to 0.1 mm.

In order to enhance the light-shielding effect at a connection between the plastic frame 19 and the light enhancement sheet 142, the backlight module further includes a light-shielding enhancement layer 18, which is disposed on an upper surface of the light enhancement sheet 142 and corresponds to the connection defined between the iron frame and the light enhancement sheet 142. Material of the light-shielding enhancement layer 18 includes black ink or light-shielding black stripes. A thickness of the light-shielding enhancement layer 18 is 0.02 mm to 0.05 mm.

Figure 2:
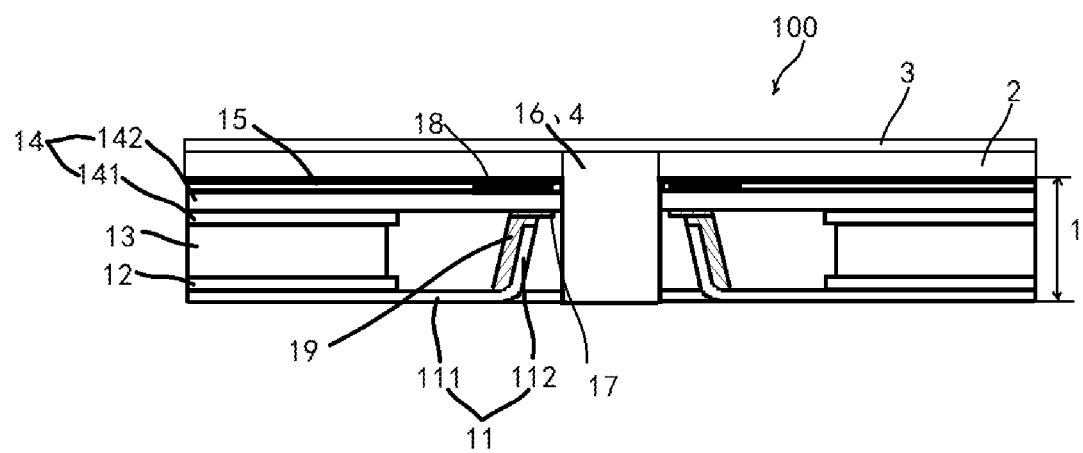
FIG. 2 is a structural view of a display device according to the first embodiment of the present invention.

Referring to FIG. 2, a display device 100 is further provided, and the display device 100 includes the backlight module of the first embodiment. The display device 100 further includes a display screen 2, a cover plate 3, and a camera 4. The light-shielding sheet 15 of the backlight module is disposed on a side of the display screen 2. The cover plate 3 is disposed on a side of the display screen 2 away from the backlight module. The blind hole 16 penetrates from the backlight module to a surface of the cover plate 3. The camera 4 is installed within the blind hole 16.

Figure 3:
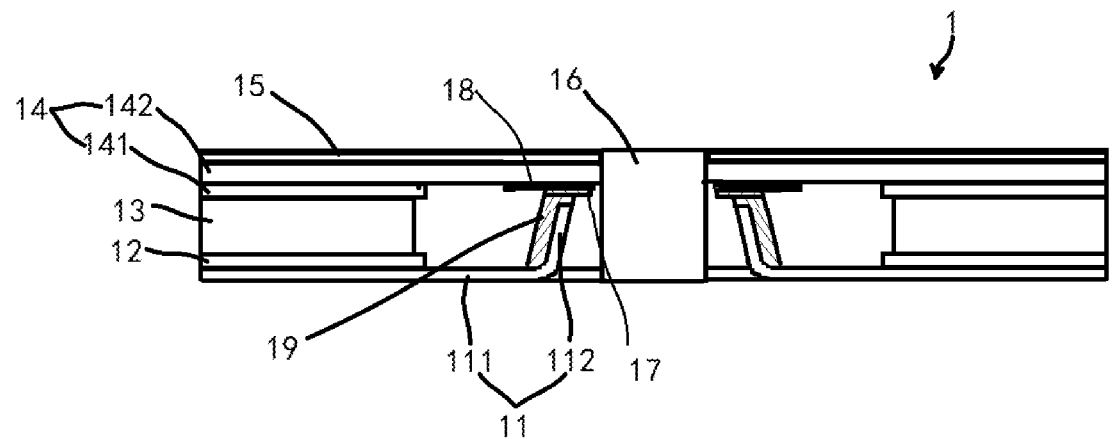
FIG. 3 is a structural view of a backlight module according to a second embodiment of the present invention.

In a second embodiment, referring to FIG. 3, a difference between the second embodiment and the first embodiment is that in order to enhance the light-shielding effect at the connection between the plastic frame 19 and the light enhancement sheet 142 and increase firmness of connection between the plastic frame 19 and the light enhancement sheet 142, a light-shielding enhancement layer 18 is disposed on a lower surface of the light enhancement sheet 142 and corresponds to the connection defined between the iron frame and the light enhancement sheet 142. That is, the light-shielding enhancement layer 18 is disposed between the lower surface of the light enhancement sheet 142 and the plastic frame 19. Material of the light-shielding enhancement layer 18 includes black ink or light-shielding black stripes. A thickness of the light-shielding enhancement layer 18 is 0.02 mm to 0.05 mm.

Figure 4:
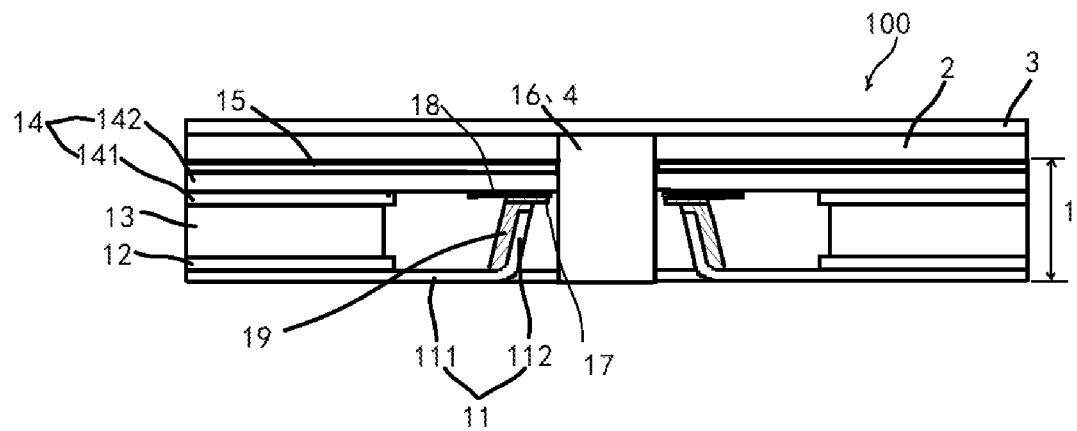
FIG. 4 is a structural view of a display device according to the second embodiment of the present invention.

Referring to FIG. 4, a display device 100 is further provided, and the display device 100 includes the backlight module of the second embodiment. The display device 100 further includes a display screen 2, a cover plate 3, and a camera 4. The light-shielding sheet 15 of the backlight module is disposed on a side of the display screen 2. The cover plate 3 is disposed on a side of the display screen 2 away from the backlight module. The blind hole 16 penetrates from the backlight module to a surface of the cover plate 3. The camera 4 is installed within the blind hole 16.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A backlight module, comprising:
a frame body comprising a frame surface and a connecting part connected to the frame surface;
a reflection sheet disposed on the frame surface;
a light guide plate disposed on the reflection sheet;
an optical film group disposed on the light guide plate, wherein the optical film group comprises a light enhancement sheet, and a top of the connecting part is connected to the light enhancement sheet through a plastic frame;
a light-shielding sheet disposed on the optical film group;
a blind hole, wherein the blind hole penetrates from the frame surface to the light-shielding sheet, and the connecting part is disposed at a periphery of the blind hole; and
an opaque glue layer disposed between the plastic frame and the light enhancement sheet.

2. The backlight module according to claim 1, wherein the optical film group further comprises a diffusion sheet, wherein the diffusion sheet is disposed on the light guide plate, and the light enhancement sheet is disposed on the diffusion sheet.

3. The backlight module according to claim 1, wherein the opaque glue layer is made of liquid glue.

4. The backlight module according to claim 3, wherein a color of the opaque glue layer comprises black or gray.

5. The backlight module according to claim 1, wherein a thickness of the opaque glue layer is 0.03 mm to 0.1 mm.

6. The backlight module according to claim 1, further comprising a light-shielding enhancement layer, wherein the light-shielding enhancement layer is disposed on an upper surface or a lower surface of the light enhancement sheet, and the light-shielding enhancement layer is correspondingly disposed at a connection between the frame body and the light enhancement sheet.

7. The backlight module according to claim 6, wherein material of the light-shielding enhancement layer comprises black ink or light-shielding black stripes.

8. The backlight module according to claim 6, wherein a thickness of the light-shielding enhancement layer is 0.02 mm to 0.05 mm.

9. A display device, comprising the backlight module of claim 1.

10. The display device according to claim 9, further comprising:
- a display screen, wherein the light-shielding sheet of the backlight module is disposed on a side of the display screen; and
- a cover plate disposed on a side of the display screen away from the backlight module;
- wherein the blind hole penetrates from the backlight module to a surface of the cover plate.

* * * * *